US011277064B2

(12) United States Patent
Chen et al.

(10) Patent No.: US 11,277,064 B2
(45) Date of Patent: Mar. 15, 2022

(54) OVERVOLTAGE PROTECTION CIRCUIT, INTEGRATED CIRCUIT AND SWITCHING CONVERTER WITH THE SAME

(71) Applicant: Silergy Semiconductor Technology (Hangzhou) LTD, Hangzhou (CN)

(72) Inventors: Dengke Chen, Hangzhou (CN); Hongfeng Fan, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 340 days.

(21) Appl. No.: 16/007,554

(22) Filed: Jun. 13, 2018

(65) Prior Publication Data
US 2018/0367027 A1 Dec. 20, 2018

(30) Foreign Application Priority Data
Jun. 20, 2017 (CN) .......................... 201710471550.5

(51) Int. Cl.
*H02M 3/156* (2006.01)
*H02M 1/32* (2007.01)
*H02H 1/00* (2006.01)
*H02M 1/36* (2007.01)
*H02M 1/08* (2006.01)
*H02M 1/00* (2006.01)

(52) U.S. Cl.
CPC ............ *H02M 1/32* (2013.01); *H02H 1/0007* (2013.01); *H02M 1/36* (2013.01); *H02M 3/156* (2013.01); *H02M 1/0009* (2021.05); *H02M 1/0038* (2021.05); *H02M 1/08* (2013.01)

(58) Field of Classification Search
CPC .......................................... H02M 3/155–1588
See application file for complete search history.

(56) References Cited

U.S. PATENT DOCUMENTS

| | | | |
|---|---|---|---|
| 8,067,925 B2 | 11/2011 | Grimm | |
| 8,710,905 B2 | 4/2014 | Chen | |
| 9,083,252 B2 * | 7/2015 | Ozalevli | ........... H02M 3/33523 |
| 9,369,049 B2 | 6/2016 | Xu | |
| 9,461,466 B2 * | 10/2016 | Heurtier | ................... H02H 9/04 |
| 9,525,283 B2 | 12/2016 | Xu | |
| 2006/0290333 A1 | 12/2006 | Fukushi et al. | |
| 2007/0257651 A1 * | 11/2007 | Wrathall | ............. H02M 3/1588 323/284 |
| 2011/0133711 A1 | 6/2011 | Murakami et al. | |
| 2013/0063990 A1 | 3/2013 | Yang | |
| 2014/0035544 A1 * | 2/2014 | Chen | ..................... H02M 3/158 323/271 |
| 2014/0152274 A1 * | 6/2014 | Lee | ......................... H02M 1/32 323/271 |
| 2016/0172999 A1 * | 6/2016 | Fogg | ................... H02M 3/1588 363/53 |

(Continued)

*Primary Examiner* — Peter M Novak

(57) ABSTRACT

An overvoltage protection circuit configured to prevent an overvoltage of an output voltage of a switching converter, can include: an output voltage simulation circuit configured to generate an output voltage simulation signal according to circuit parameters of the switching converter, where the output voltage simulation signal changes along with the output voltage; and an overvoltage signal generator configured to activate an overvoltage signal when a feedback voltage is less than a first threshold value and the output voltage simulation signal is greater than a second threshold value.

10 Claims, 9 Drawing Sheets

(56) References Cited

U.S. PATENT DOCUMENTS

| | | | |
|---|---|---|---|
| 2016/0285368 A1* | 9/2016 | Qiu | H02M 3/156 |
| 2016/0373002 A1* | 12/2016 | Borfigat | H02M 3/156 |
| 2017/0063238 A1 | 3/2017 | Hang et al. | |
| 2017/0093278 A1* | 3/2017 | Unno | H02M 1/32 |

* cited by examiner

OVERVOLTAGE PROTECTION CIRCUIT, INTEGRATED CIRCUIT AND SWITCHING CONVERTER WITH THE SAME

RELATED APPLICATIONS

This application claims the benefit of Chinese Patent Application No. 201710471550.5, filed on Jun. 20, 2017, which is incorporated herein by reference in its entirety.

FIELD OF THE INVENTION

The present invention generally relates to the field of power electronics, and more particularly to overvoltage protection circuitry, and associated integrated circuits and switching converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
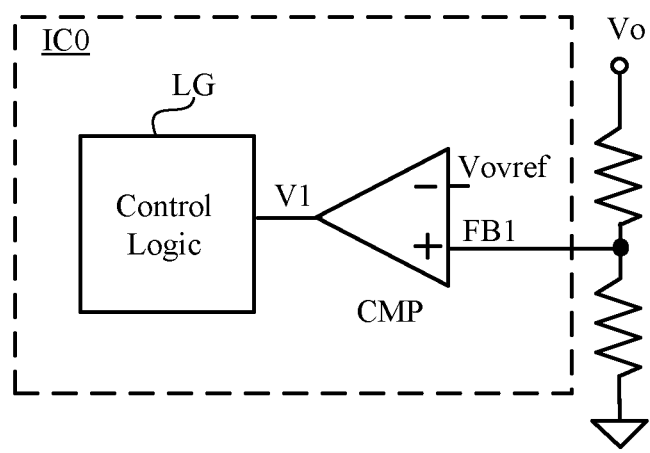
FIG. 1 is a schematic block diagram of an example overvoltage protection circuit.

Referring now to FIG. 1, shown is a schematic block diagram of an example overvoltage protection circuit. Overvoltage protection circuit can be provided to shut down a switching converter for protection when an output voltage is out of control, such that the damage on the load due to the overvoltage may be prevented. In this example overvoltage protection circuit, a control circuit can obtain output voltage sampling signal FB1 through a separate or shared resistor divider network. Comparator CMP can compare output voltage sampling signal FB1 against protection reference voltage Vovref, and may output overvoltage signal V1. Overvoltage signal V1 can convert a comparison result into an overvoltage protection signal based on control logic CL in the same integrated circuit IC0, and can trigger overvoltage protection when voltage sampling signal FB1 is greater than protection reference voltage Vovref. However, this example overvoltage protection circuit may need an additional pin to output voltage sampling in the integrated circuit, which can result in increased chip area. Also, the overvoltage protection circuit may rely on the external resistor divider network outside of the chip (e.g., IC0). Because the failure rate of an external circuit is typically higher than that of the integrated circuit, the overvoltage protection circuit may not function normally when the connection in the resistor divider network fails.

In one embodiment, an overvoltage protection circuit configured to prevent an overvoltage of an output voltage of a switching converter, can include: (i) an output voltage simulation circuit configured to generate an output voltage simulation signal according to circuit parameters of the switching converter, where the output voltage simulation signal changes along with the output voltage; and (ii) an overvoltage signal generator configured to activate an overvoltage signal when a feedback voltage is less than a first threshold value and the output voltage simulation signal is greater than a second threshold value.

Figure 2:
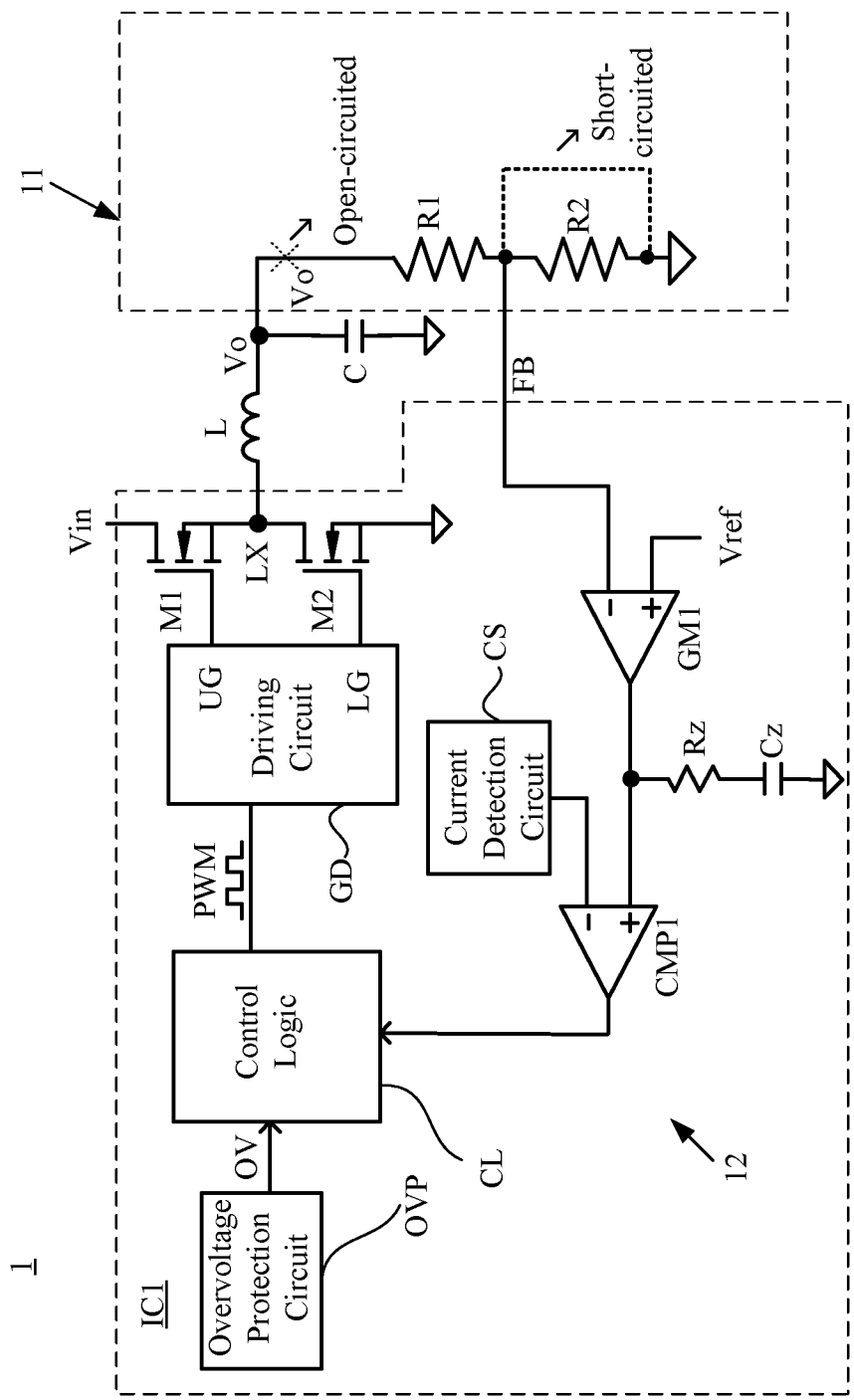
FIG. 2 is a schematic block diagram of a first example switching converter, in accordance with embodiments of the present invention.

Referring now to FIG. 2, shown is a schematic block diagram of a first example switching converter, in accordance with embodiments of the present invention. In this particular example, the switching converter is implemented with a BUCK topology. Switching converter 1 can include main power switch M1, rectifier switch M2, inductor L, output capacitor C, output voltage feedback circuit 11, and control circuit 12. Main power switch M1, rectifier switch M2, inductor L, and output capacitor C can be arranged in the form of a BUCK topology. In the BUCK topology, phase detection terminal LX of an inductor voltage is a common terminal of main power switch M1 and inductor L. A voltage phase of inductor L can be detected on phase detection terminal LX of the inductor voltage. Output voltage feedback circuit 11 can be a resistor divider network coupled to the output terminal of switching converter 1, which can include series coupled resistors R1 and R2. Feedback voltage FB can be output at a common terminal of resistors R1 and R2.

Control circuit 12 can include transconductance amplifier GM1, a compensation circuit, comparator CMP1, current detection circuit CS, control logic CL, driving circuit GD, and overvoltage protection OVP. Transconductance amplifier GM1 can receive reference voltage Vref and feedback voltage FB, and may output an error amplified signal. The compensation circuit can include resistor Rz and capacitor Cz coupled in series between an output terminal of transconductance amplifier GM1 and ground. Transconductance amplifier GM1 and the compensation circuit may function together in order to generate a compensation signal that represents a difference between an output voltage and reference voltage Vref. Current detection circuit CS can obtain changes in the inductor current, and may form a current control loop with faster feedback speed. Comparator CMP1 can compare the compensation signal against a signal from current detection circuit CS, and can output a state control signal to control logic CL. Control logic CL can generate pulse width modulation signal PWM according to the state control signal. Pulse width modulation signal PWM may determine the duty cycle of switching converter 1. Driving circuit GD may generate switching control signals according to pulse width modulation signal PWM, in order to control main power switch M1 and rectifier switch M2.

In most cases, pulse width modulation signal PWM and the switching control signal of main power switch M1 are in phase. In this way, control circuit 12 may form a current control loop and a voltage control loop, in order to fast regulate the duty cycles of the switching control signals in response to the changes in the states of the power stage circuit. In this example control circuit, overvoltage protection circuit OVP can be coupled to control logic CL, in order to provide overvoltage signal OV to control logic CL. If overvoltage signal OV is inactive, control logic CL can generate pulse width modulation signal PWM. If overvoltage signal OV is active, control logic CL may not activate pulse width modulation signal PWM, in order to control the entire switching converter in a sleep mode. Alternatively, control logic CL can output pulse width modulation signal PWM with a minimum duty cycle, in order to quickly reduce the output voltage. That is to say, overvoltage signal OV can indicate whether the switching converter is in an overvoltage state at a given time.

Those skilled in the art will recognize that the control circuit of this example can be replaced with other suitable structures, while still using the overvoltage protection circuit provided described herein. In this particular example, main power switch M1, rectifier switch M2, and control circuit 12 can be integrated in the same integrated circuit IC1, such that a switching converter with a buck topology can be built by simply connecting an inductor, a capacitor, and some resistors at the periphery.

Figure 3:
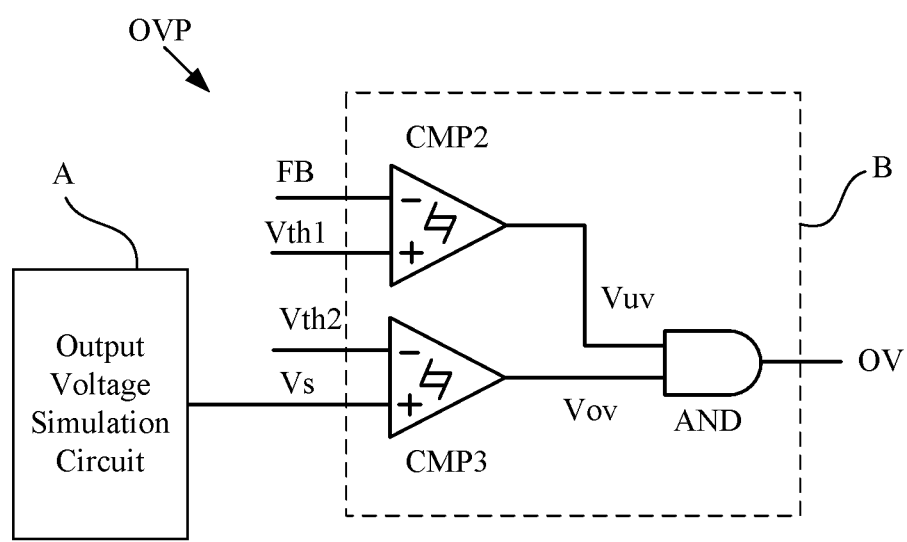
FIG. 3 is a schematic block diagram of a first example overvoltage protection circuit, in accordance with embodiments of the present invention.

Referring now to FIG. 3, shown is a schematic block diagram of a first example overvoltage protection circuit, in accordance with embodiments of the present invention. In this particular example, overvoltage protection circuit OVP can include output voltage simulation circuit A and overvoltage signal generator B. For example, output voltage simulation circuit A can generate output voltage simulation signal Vs according to circuit parameters of the switching converter. Output voltage simulation signal Vs can be a signal that changes along with the output voltage. That is, output voltage simulation signal Vs can approximately represent the output voltage.

Overvoltage signal generator B can generate an overvoltage signal OV. For example, overvoltage signal generator B can control overvoltage signal OV to be active when feedback voltage FB is less than threshold value Vth1 and output voltage simulation signal Vs is greater than threshold value Vth2, in order to indicate that the switching converter is in the overvoltage state. For example, threshold values Vth1 and Vth2 are predetermined or preset threshold values, and threshold value Vth2 is greater than threshold value Vth1. In this particular example, when resistor R2 in the resistor divider network is short-circuited (shown as a dashed line in the FIG. 2), or the circuit between the feedback voltage output terminal and an output terminal of the switching converter is open-circuited (shown as "x" in the FIG. 2), feedback voltage FB is zero. This makes control circuit 12 determine that the output voltage of the circuit is too low, thereby continuously increasing the duty cycle of main power switch M1 to increase the output voltage, and finally causing switching converter 1 to be in an overvoltage state.

Overvoltage protection circuit OVP can continuously obtain output voltage simulation signal Vs that approximately represents the output voltage through output voltage simulation circuit A. Output voltage simulation signal Vs may not be directly obtained based on the parameters at the output terminal of the switching converter, but rather by other suitable simulation approaches and/or circuitry. Therefore, output voltage simulation signal Vs and feedback signal FB may not be inaccurate at the same time. If output voltage simulation signal Vs is relatively large, and feedback voltage FB for accurately representing the output voltage is relatively small, the circuit can be determined as failed, and overvoltage signal OV may be activated. In this way, whether the external resistor divider network has failed can be accurately determined by obtaining an output voltage simulation signal that essentially changes along with the output voltage, and determining if the output voltage simulation signal and the feedback voltage can represent such completely opposite information at the same time, in order to provide overvoltage protection when the resistor divider network fails.

Overvoltage signal generator B can include comparators CMP2 and CMP3, and logical circuit AND. Comparator CMP2 can compare feedback voltage FB against threshold value Vth1. An input terminal of comparator CMP3 may be coupled to output voltage simulation circuit A for receiving output voltage simulation signal Vs. Comparator CMP3 can compare output voltage simulation signal Vs against threshold value Vth2. In the example of FIG. 3, a non-inverting input terminal of comparator CMP2 can receive threshold value Vth1, an inverting input terminal can receive feedback voltage FB, and comparator CMP2 may output a high level when feedback voltage FB is less than threshold Vth1. An inverting input terminal of comparator CMP3 can receive threshold value Vth2, a non-inverting input terminal can receive output voltage simulation signal Vs, and comparator CMP3 may output a high level when output voltage simulation signal Vs is greater than threshold value Vth2. Logic circuit AND can include an AND-gate, which can output a high level when both of comparators CMP2 and CMP3 output high levels, and may output a low level under other conditions.

The output of logic circuit AND can be configured as overvoltage signal OV. Overvoltage signal OV may switch to a high level when feedback voltage FB is less than threshold value Vth1 and output voltage simulation signal Vs is greater than threshold value Vth2. Under other conditions, overvoltage signal OV may be low. In the example of FIG. 3, comparators CMP2 and CMP3 are hysteresis comparators. Those skilled in the art will recognize that other types of comparators can also be used in certain embodiments. In addition, the input pins of the signals, the setting of the active levels, and the structure of the logic circuit can be altered in certain embodiments. Along these lines, the setting of the active levels, the input pins of the signals, and adaptively change the structure of the logic circuit to achieve the same function under different application scenarios may also be supported in particular embodiments.

In particular embodiments, output voltage simulation circuit A can be implemented in many different ways. In this particular example, output voltage simulation circuit A can generate output voltage simulation signal Vs according to voltage Vlx at phase detection terminal LX of the inductor voltage of the switching converter. In switching converter 1, the output voltage can be obtained by providing the voltage at phase detection terminal LX of the inductor voltage to the output terminal through inductor L and capacitor C. Thus, in an integrated circuit, the influence of the LC circuit on voltage Vlx can be "simulated" or approximated by an RC filter circuit, in order to obtain a voltage that approximately represents the changes in the output voltage.

Figure 4:
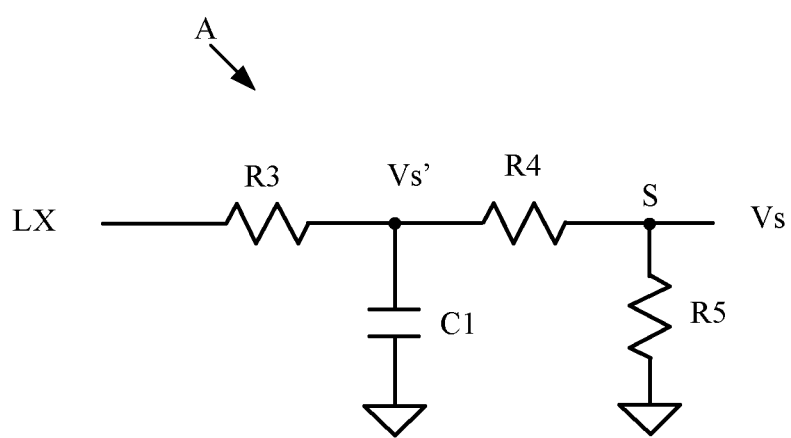
FIG. 4 is a schematic block diagram of a first example output voltage simulation circuit, in accordance with embodiments of the present invention.

Referring now to FIG. 4, shown is a schematic block diagram of a first example output voltage simulation circuit, in accordance with embodiments of the present invention. In this particular example, output voltage simulation circuit A can include an RC filter circuit and a resistor divider network. The RC filter circuit can include resistor R3 and capacitor C1. The input terminal of the RC filter circuit can be coupled to phase detection terminal LX of the inductor voltage, and the output terminal may be a common terminal of resistor R3 and capacitor C1. The resistor divider network can include resistors R4 and R5 coupled in series. The resistor divider network can divide the voltage at the output terminal of the RC filter circuit, and output voltage simulation signal Vs may be provided at the common terminal of resistors R4 and R5.

Therefore, through a relatively simple resistor and capacitor network, the voltage signal for approximately representing the output voltage can be obtained according to voltage Vlx at phase detection terminal LX of the inductor voltage. The circuit structure is relatively simple, and the occupied IC area relatively small, which is suitable for integration. Also, as shown in FIG. 2, phase detection terminal LX of the inductor voltage can be inside integrated circuit IC1, so there is no need to set a pin in order to obtain circuit parameters from outside of the integrated circuit. Optionally, more complex circuitry can also be used to obtain a voltage signal that accurately represents the output voltage.

Figure 5:
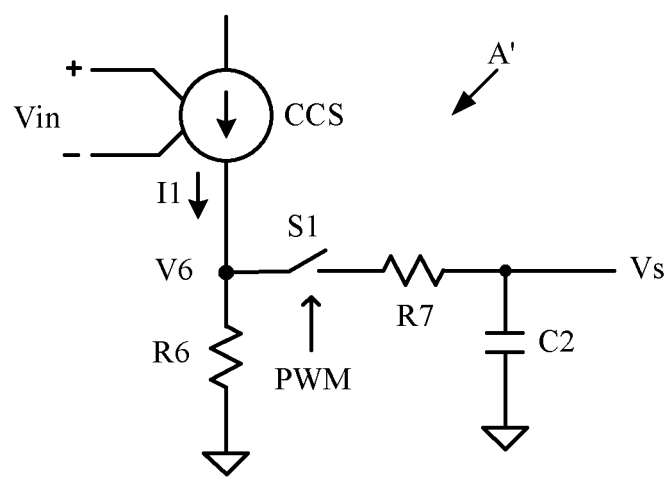
FIG. 5 is a schematic block diagram of a second example output voltage simulation circuit, in accordance with embodiments of the present invention.

Referring now to FIG. 5, shown is a schematic block diagram of a second example output voltage simulation circuit, in accordance with embodiments of the present invention. In this particular example, output voltage simulation circuit A' may generate output voltage simulation signal Vs according to one of input voltage Vin and an input voltage sampling value as well as a signal that is in phase with the switching control signal of the switching converter. Output voltage simulation circuit A' can include controlled current source CCS, resistor R6, switch S1, and an RC filter circuit.

Controlled current source CCS can generate current I1 that is in proportion to input voltage Vin or the input voltage sampling value. Resistor R6 can connect between an output terminal of controlled current source CCS and ground. One terminal of switch S1 can connect to the output terminal of controlled current source CCS, and another terminal of switch S1 can connect to input terminal of the RC filter circuit. Switch S1 may be controlled by signal PWM (a pulse width modulation signal) that is in phase with the switching control signal. The RC filter circuit can include resistor R7 and capacitor C2. Resistor R7 can connect between switch S1 and the output terminal of output voltage simulation circuit A'. Capacitor C2 can connect between the output terminal and ground.

In the example circuit of FIG. 5, current I1=k*Vin. The voltage drop of resistor R6 is V6=k*Vin*R6. Switch S1 can be controlled by pulse width modulation signal PWM, and is turned and off synchronously with main power switch M1. Thus, voltage Vs at the output terminal may satisfy: Vs=D*V6=k*D*Vin*R6. For a switching converter of Buck topology, Vin*D=Vo, where Vo is the output voltage of the switching converter. Thus the output voltage simulation signal Vs may satisfy equation (1) below.

$$Vs=k*R6*Vo \quad (1)$$

That is, output voltage simulation signal Vs is proportional to output voltage Vo. In this way output voltage simulation signal Vs can accurately represent output voltage Vo.

Figure 6:
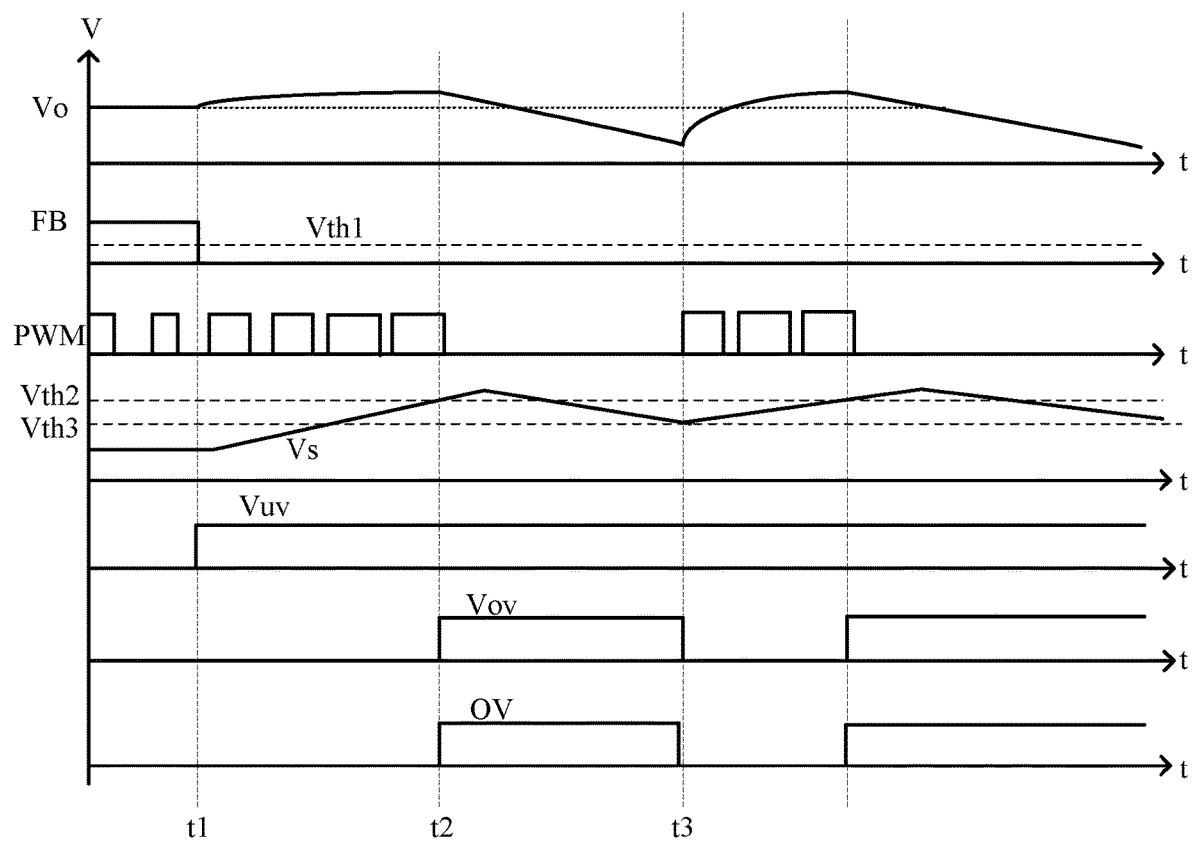
FIG. 6 is a waveform diagram of a second example switching converter, in accordance with embodiments of the present invention.

Referring now to FIG. 6, shown is a waveform diagram of a second example switching converter, in accordance with embodiments of the present invention. Referring also to FIGS. 2 and 3, prior to time t1, the switching converter may operate normally, and output voltage Vo can remain constant. Accordingly, feedback voltage FB can remain constant. At time t1, resistor R1 in the resistor divider network is short-circuited, so feedback voltage FB may decrease to zero. Since feedback voltage FB remains less than threshold value Vth1, output signal Vuv of comparator CMP2 can remain high from time t1. Control circuit 12 can operate based on feedback voltage FB, in order to continuously increase the duty cycle, so that the output voltage Vo continuously rises. Since the duty cycle of the switching control signal rises, output voltage simulation signal Vs may also continuously rise based on input voltage Vin and signal PWM that is synchronous with the switching control signal.

At time t2, output voltage simulation signal Vs can increase to be greater than threshold value Vth2, such that output signal Vov of comparator CMP3 remains high from time t2. Further, the outputs of comparators CMP2 and CMP3 may both be high. Overvoltage signal OV can switch to a high level, in order to disable control logic CL to no longer activate (or generate the pulses of) the PWM signal. Thus, output voltage Vo may decrease until time t3. Output voltage simulation signal Vs can decrease along with output voltage Vo until it is less than state switching threshold Vth3 of hysteresis comparator CMP3 at time t3, such that output voltage Vov of comparator CMP3 switches to a low level. This in turn may switch the overvoltage signal to a low level, and the switching converter starts operating again. In FIG. 6, since the failure is not removed, control circuit 12 may keep increasing the duty cycle until the output voltage simulation signal is again higher than threshold value Vth2, and so on. By controlling the switching converter to intermittently operate after a fault occurs, the output voltage may vary in a controllable range when the resistor divider network fails, in order to avoid damage on the entire circuit due to overvoltage.

Figure 7:
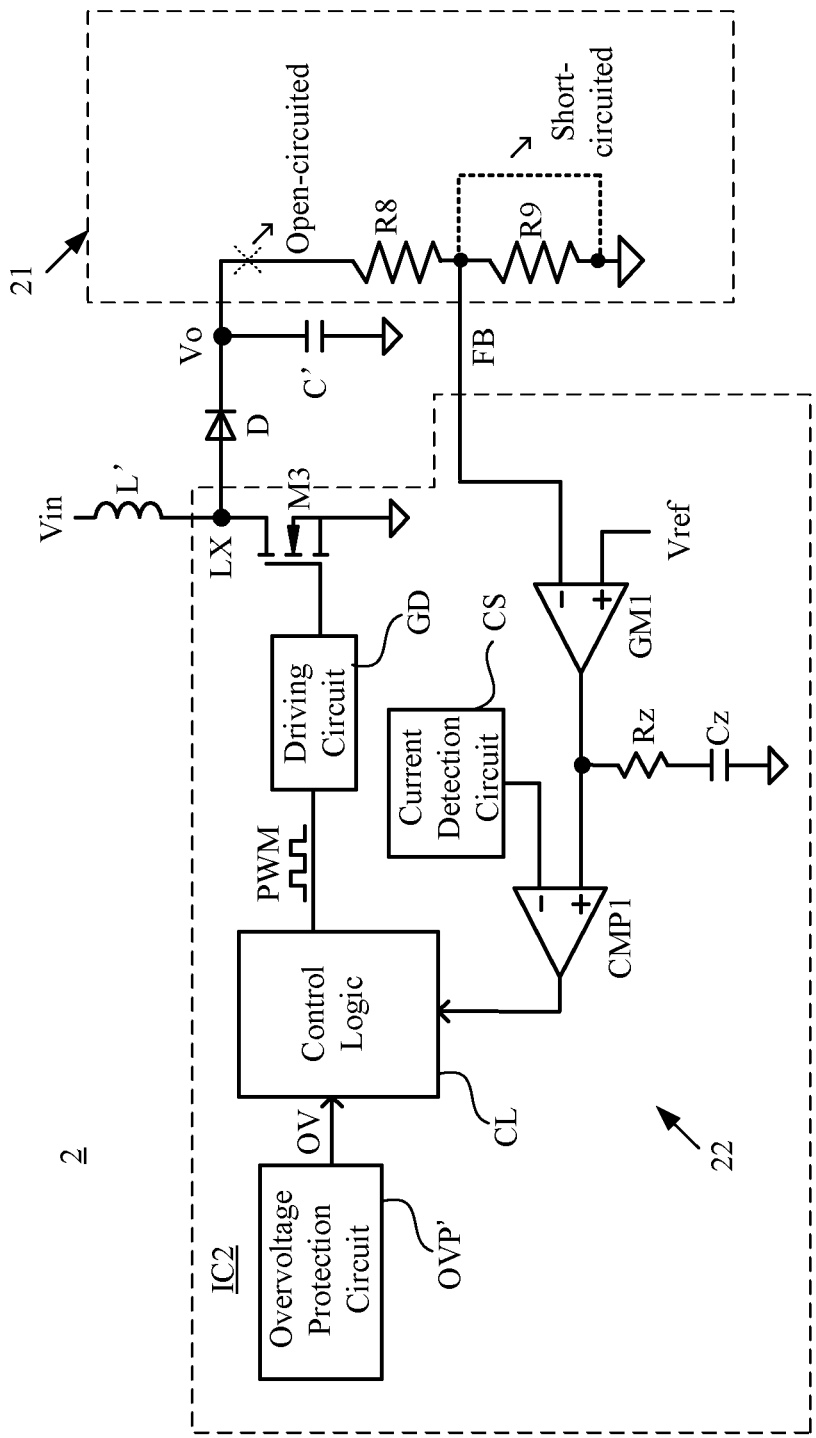
FIG. 7 is a schematic block diagram of a third example switching converter, in accordance with embodiments of the present invention.

Referring now to FIG. 7, shown is a schematic block diagram of a third example switching converter, in accordance with embodiments of the present invention. In this particular example, the switching converter is implemented with Boost topology. Switching converter 2 can include main power switch M3, rectifier diode D, inductor L', output capacitor C', output voltage feedback circuit 21, and control circuit 22. Main power switch M3, rectifier diode D, inductor L', and output capacitor C' can be arranged in the form of a Boost topology. In the Boost topology, phase detection terminal LX of the inductor voltage is a common node of main power switch M3 and inductor L'. A voltage phase of inductor L' can be detected on phase detection terminal LX of the inductor voltage. Output voltage feedback circuit 21 may be a resistor divider network coupled to the output terminal of switching converter 2 that includes series coupled resistors R8 and R9. Feedback voltage FB can be provided on a common terminal of resistors R8 and R9.

In control circuit 22, overvoltage protection circuit OVP' can be coupled to control logic CL, and may output overvoltage signal OV to control logic CL. If overvoltage signal OV is inactive, control logic CL can generate pulse width modulation signal PWM. If overvoltage signal OV is active, control logic CL may not activate pulse width modulation signal PWM, to place the entire switching converter in a sleep mode. Alternatively, control logic CL may output pulse width modulation signal PWM with a minimum duty cycle, in order to quickly reduce the output voltage. That is to say, overvoltage signal OV can indicate whether the switching converter is in the overvoltage state at a given time. In this particular example, main power switch M3, rectifier diode D, and control circuit 22 may be integrated in the same integrated circuit IC2, such that a switching converter with a Boost topology can be built by simply connecting an inductor, a capacitor, and some resistors at the periphery.

Figure 8:
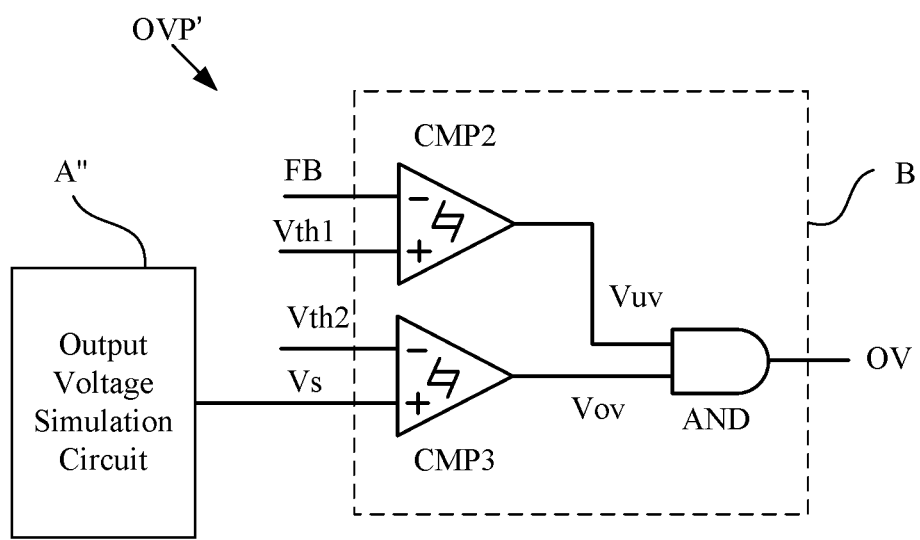
FIG. 8 is a schematic block diagram of a third example overvoltage protection circuit, in accordance with embodiments of the present invention.

Referring now to FIG. 8, shown is a schematic block diagram of a third example overvoltage protection circuit, in accordance with embodiments of the present invention. In this particular example, overvoltage protection circuit OVP can include output voltage simulation circuit A" and overvoltage signal generator B. For example, output voltage simulation circuit A" can generate output voltage simulation signal Vs according to circuit parameters of the switching converter, and output voltage simulation signal Vs is essentially a signal that changes along with the output voltage. That is, output voltage simulation signal Vs can approximately represent the output voltage. For example, output voltage simulation signal Vs can be generated in a different manner from that of feedback voltage FB. Overvoltage signal generator B can generate an overvoltage signal OV. For example, overvoltage signal generator B can control overvoltage signal OV to be active in a case that feedback voltage FB is less than threshold value Vth1 and output voltage simulation signal Vs is greater than threshold value Vth2, in order to indicate that the switching converter is in an overvoltage state. Also, threshold values Vth1 and Vth2 can be preset threshold values, and threshold value Vth2 may be greater than threshold value Vth1.

Overvoltage signal generator B can include comparators CMP2 and CMP3, and logic circuit AND. Comparator CMP2 can compare feedback voltage FB against threshold value Vth1. An input terminal of comparator CMP3 can connect to output voltage simulation circuit A" for receiving output voltage simulation signal Vs. Comparator CMP3 can compare output voltage simulation signal Vs against threshold value Vth2. In this example, a non-inverting input terminal of comparator CMP2 can receive threshold value Vth1, an inverting input terminal can receive feedback voltage FB, and comparator CMP2 may output a high level when feedback voltage FB is less than threshold Vth1. An inverting input terminal of comparator CMP3 can receive threshold value Vth2, a non-inverting input terminal can receive output voltage simulation signal Vs, and comparator CMP3 may output a high level when output voltage simulation signal Vs is greater than threshold value Vth2. Logic circuit AND can include an AND-gate, which outputs a high level when both comparators CMP2 and CMP3 output high levels, and outputs a low level under other conditions. The output of logic circuit AND is configured as overvoltage signal OV, and overvoltage signal OV may go high when feedback voltage FB is less than threshold value Vth1 and output voltage simulation signal Vs is greater than threshold value Vth2.

In this particular example, since the switching converter is a Boost topology, output voltage simulation circuit A" can generate output voltage simulation signal Vs in a different way relative to the above example. For example, for Boost topology, during the off time of main power switch M3, rectifier diode D is turned on. At this time, voltage Vlx at phase detection terminal LX of the inductor voltage is equal to output voltage Vo. Thus, output voltage simulation circuit A" can generate output voltage simulation signal Vs by sampling the voltage at the phase detection terminal of the inductor voltage during the off time of the main power switch in the switching converter.

Figure 9:
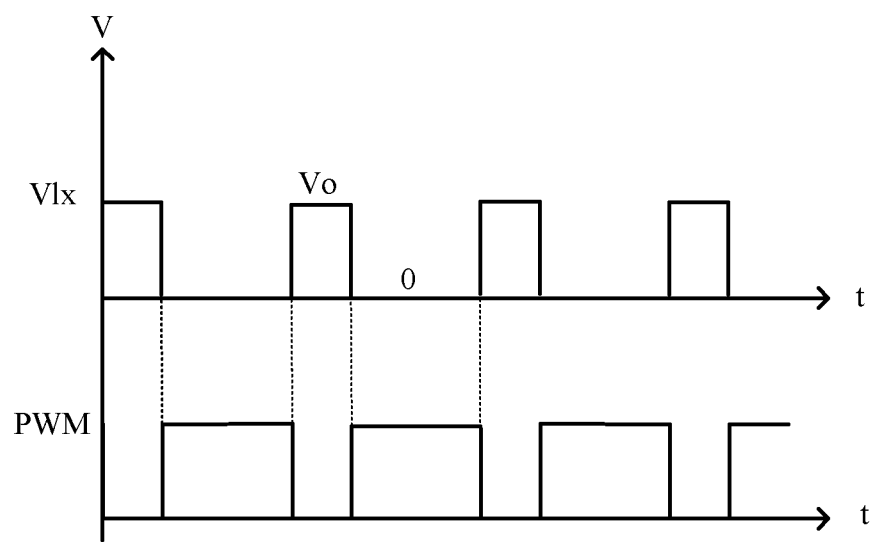
FIG. 9 is a waveform diagram of an example switching converter, in accordance with embodiments of the present invention.

Referring now to FIG. 9, shown is a waveform diagram of an example switching converter, in accordance with embodiments of the present invention. As shown in FIG. 9, when pulse width modulation signal PWM is at low level, voltage Vlx is a value that corresponds to output voltage Vo. In this example, whether the external resistor divider network has failed can be accurately determined by obtaining an output voltage simulation signal that changes along with the output voltage, and determining if the output voltage simulation signal and the feedback voltage represent opposite information at the same time, in order to provide overvoltage protection when the resistor divider network fails.

Examples of Buck topology and Boost topology are utilized to describe the overvoltage protection circuit, the integrated circuit, and the switching converter herein. Those skilled in the art will recognize that the overvoltage protection circuit in certain embodiments may also be applied to switching converters of other configurations, as long as the output voltage simulation signal which can approximately represent the output voltage in a way that is different from that of direct voltage division.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An overvoltage protection circuit configured to prevent an overvoltage of an output voltage of a switching converter that is controlled by a pulse-width modulation (PWM) signal, the overvoltage protection circuit comprising:

an output voltage simulation circuit configured to generate an output voltage simulation signal according to a voltage phase of an inductor detected by a voltage at a phase detection terminal of said inductor and having switching information, wherein said output voltage simulation signal changes along with and represents said output voltage without being generated using said output voltage; and an overvoltage signal generator configured to activate an overvoltage signal when a feedback voltage that is generated using said output voltage is less than a first threshold value and said output voltage simulation signal is greater than a second threshold value, wherein said PWM signal is not activated when said overvoltage signal is activated.

2. The overvoltage protection circuit of claim 1, wherein said overvoltage signal generator comprises:
   a first comparator configured to compare said feedback voltage against said first threshold value;
   a second comparator configured to compare said output voltage simulation signal against said second threshold value; and
   a logic circuit configured to generate said overvoltage signal according to output signals of said first and second comparators.

3. The overvoltage protection circuit of claim 1, wherein: said switching converter comprises a Buck topology; and said output voltage simulation circuit is configured to generate said output voltage simulation signal according to a voltage at said phase detection terminal.

4. The overvoltage protection circuit of claim 3, wherein said output voltage simulation circuit comprises:
   an RC filter circuit having an input terminal coupled to said phase detection terminal; and
   a resistor divider network configured to divide a voltage at an output terminal of said RC filter circuit, and to generate said output voltage simulation signal.

5. The overvoltage protection circuit of claim 1, wherein: said switching converter comprises a Boost topology; and said output voltage simulation circuit is configured to generate said output voltage simulation signal by sampling a voltage at said phase detection terminal during an off time of a main power switch in said switching converter.

6. The overvoltage protection circuit of claim 1, wherein said second threshold value is greater than said first threshold value.

7. An integrated circuit, comprising said switching converter of claim 1 and said overvoltage protection circuit of claim 1.

8. An apparatus for supplying power to a load, the apparatus comprising said overvoltage protection circuit of claim 1.

9. The overvoltage protection circuit of claim 1, wherein said switching converter enters a sleep mode when said overvoltage protection signal is activated.

10. An overvoltage protection circuit configured to prevent an overvoltage of an output voltage of a switching converter that is controlled by a pulse-width modulation (PWM) signal, the overvoltage protection circuit comprising:
   an output voltage simulation circuit that is not coupled to an inductor in said switching converter, and being configured to generate an output voltage simulation signal according to at least one of an input voltage, an input voltage sampling value, and said PWM signal, wherein said output voltage simulation signal changes along with and represents said output voltage without being generated using said output voltage; and
   an overvoltage signal generator configured to activate an overvoltage signal when a feedback voltage that is generated using said output voltage is less than a first threshold value and said output voltage simulation signal is greater than a second threshold value, wherein said PWM signal is not activated when said overvoltage signal is activated,
   wherein said output voltage simulation circuit comprises:
      a controlled current source configured to generate a current that is in proportion to at least one of said input voltage and said input voltage sampling value;
      a resistor coupled between an output terminal of said controlled current source and ground;
      a switch having one terminal coupled to said output terminal of said controlled current source, and being controlled by at least one of said switching control signal of said switching converter, and said signal that is synchronous with said switching control signal; and
      an RC filter circuit having an input terminal coupled to another terminal of said switch to output said output voltage simulation signal.

* * * * *